(12) United States Patent
Rudolph et al.

(10) Patent No.: US 10,005,218 B2
(45) Date of Patent: Jun. 26, 2018

(54) METHOD FOR PRODUCING EXPANDED GRANULES

(71) Applicant: BASF SE, Ludwigshafen (DE)

(72) Inventors: Hans Rudolph, Bad Essen Harpenfeld (DE); Rainer Klostermann, Rahden (DE); Torben Kaminsky, Lemförde (DE); Bernd Lohaus, Hemsloh (DE); Jürgen Ahlers, Groß-Rohrheim (DE); Bernhard Schmied, Frankenthal (DE); Peter Gutmann, Karlsruhe (DE); Klaus Hahn, Kirchheim (DE); Frank Prissok, Lemförde (DE); Elke Marten, Ostercappeln (DE); Christian Däschlein, Mannheim (DE)

(73) Assignee: BASF SE, Ludwigshafen (DE)

( * ) Notice: Subject to any disclaimer, the term of this patent is extended or adjusted under 35 U.S.C. 154(b) by 575 days.

(21) Appl. No.: 14/391,870

(22) PCT Filed: Apr. 12, 2013

(86) PCT No.: PCT/EP2013/057655
§ 371 (c)(1),
(2) Date: Oct. 10, 2014

(87) PCT Pub. No.: WO2013/153190
PCT Pub. Date: Oct. 17, 2013

(65) Prior Publication Data
US 2015/0174808 A1 Jun. 25, 2015

(30) Foreign Application Priority Data

Apr. 13, 2012 (EP) .................................... 12164076

(51) Int. Cl.
B29C 47/00 (2006.01)
B29B 9/06 (2006.01)
(Continued)

(52) U.S. Cl.
CPC .......... *B29C 47/0011* (2013.01); *B29B 9/065* (2013.01); *B29B 9/12* (2013.01);
(Continued)

(58) Field of Classification Search
CPC .... B29C 47/0011; B29C 44/3461; C08J 9/16; C08J 9/141; C08J 9/34; C08J 9/122;
(Continued)

(56) References Cited

U.S. PATENT DOCUMENTS 4,882,363 A   11/1989   Neuhaus et al.
5,605,937 A * 2/1997   Knaus ............... B29B 9/06
                                               264/50

(Continued)

FOREIGN PATENT DOCUMENTS

CA   2817678 A1   5/2012
EP   0319866 A2   6/1989
(Continued)

OTHER PUBLICATIONS

International Search Report for PCT/EP2013/057578 dated May 28, 2013.
(Continued)

*Primary Examiner* — Jeffrey Wollschlager
*Assistant Examiner* — Armand Melendez
(74) *Attorney, Agent, or Firm* — Drinker Biddle & Reath LLP

(57) ABSTRACT

The invention relates to a process for production of expanded pellets from a polymer melt comprising a blowing agent, said process comprising the steps of:
  a) pressing the polymer melt comprising a blowing agent through a perforated disk controlled to a temperature between 150° C. and 280° C. and into a pelletizing chamber,
(Continued)

b) using a cutting device to comminute the polymer melt pressed through the temperature-controlled perforated disk into individual expanding pellets, c) discharging the pellets from the pelletizing chamber using a liquid stream, wherein the blowing agent comprises $CO_2$ or $N_2$ or a combination of $CO_2$ and $N_2$ and the pelletizing chamber is traversed by a stream of liquid which is controlled to a temperature between 10° C. and 60° C. and the pressure of which is from 0.7 bar to 20 bar above ambient pressure, the pressure and temperature for the liquid in the pelletizing chamber and also the temperature for the perforated disk being chosen such that the pellets are expanded in the pressurized liquid by the blowing agent they contain so as to produce expanded pellets having an uninterrupted skin.

7 Claims, 1 Drawing Sheet

(51) Int. Cl.
| | |
|---|---|
| *C08G 18/66* | (2006.01) |
| *C08G 18/76* | (2006.01) |
| *C08J 9/12* | (2006.01) |
| *C08G 18/08* | (2006.01) |
| *B29C 44/34* | (2006.01) |
| *B29B 9/12* | (2006.01) |
| *B29B 9/14* | (2006.01) |
| *B29B 9/16* | (2006.01) |
| *C08J 9/14* | (2006.01) |
| *C08J 9/16* | (2006.01) |
| *C08J 9/34* | (2006.01) |
| *B29K 75/00* | (2006.01) |
| *B29L 31/00* | (2006.01) |

(52) U.S. Cl.
CPC ............... *B29B 9/14* (2013.01); *B29B 9/16* (2013.01); *B29C 44/3461* (2013.01); *C08G 18/0895* (2013.01); *C08G 18/6674* (2013.01); *C08G 18/7671* (2013.01); *C08J 9/122* (2013.01); *C08J 9/141* (2013.01); *C08J 9/16* (2013.01); *C08J 9/34* (2013.01); *B29K 2075/00* (2013.01); *B29L 2031/00* (2013.01); *C08J 2201/03* (2013.01); *C08J 2203/06* (2013.01); *C08J 2203/14* (2013.01); *C08J 2203/182* (2013.01); *C08J 2300/22* (2013.01); *C08J 2367/00* (2013.01); *C08J 2375/04* (2013.01); *C08J 2377/00* (2013.01)

(58) Field of Classification Search
CPC ............... C08J 2203/14; C08J 2300/22; C08J 2203/06; C08J 2201/03; C08J 2203/182; C08J 2377/00; C08G 18/6674; C08G 18/0895; C08G 18/7671; B29L 2031/00; B29K 2075/00

See application file for complete search history.

(56) References Cited

U.S. PATENT DOCUMENTS

| | | | |
|---|---|---|---|
| 5,679,718 A | 10/1997 | Suh et al. | |
| 6,391,931 B1 * | 5/2002 | Gehlsen | B29C 44/348 521/134 |
| 2005/0197413 A1 | 9/2005 | Grimm et al. | |
| 2010/0047550 A1 * | 2/2010 | Prissok | C08G 18/10 428/313.5 |
| 2012/0329892 A1 * | 12/2012 | Prissok | C08G 18/4854 521/60 |
| 2013/0150468 A1 * | 6/2013 | Fussi | C08J 9/0061 521/59 |
| 2016/0121524 A1 * | 5/2016 | Daschlein | B29B 9/06 264/54 |

FOREIGN PATENT DOCUMENTS

| | | | | |
|---|---|---|---|---|
| EP | 1266928 A1 | 12/2002 | | |
| EP | 1571168 A1 | 9/2005 | | |
| EP | 2565224 A1 | 3/2013 | | |
| WO | WO 2007082838 A1 * | 7/2007 | ......... | C08G 18/4854 |
| WO | WO-2007082838 A1 | 7/2007 | | |
| WO | WO 2011086030 A2 * | 7/2011 | ............ | C08J 9/0061 |
| WO | WO-2011086030 A2 | 7/2011 | | |
| WO | WO-2012062682 A1 | 5/2012 | | |
| WO | WO-2013153153 A1 | 10/2013 | | |

OTHER PUBLICATIONS

International Search Report for PCT/EP2013/057655 dated Sep. 10, 2013.

Ullmann's Enzyklopädie der Technischen Chemie, Fourth Edition, vol. 4, pp. 416-417.

\* cited by examiner

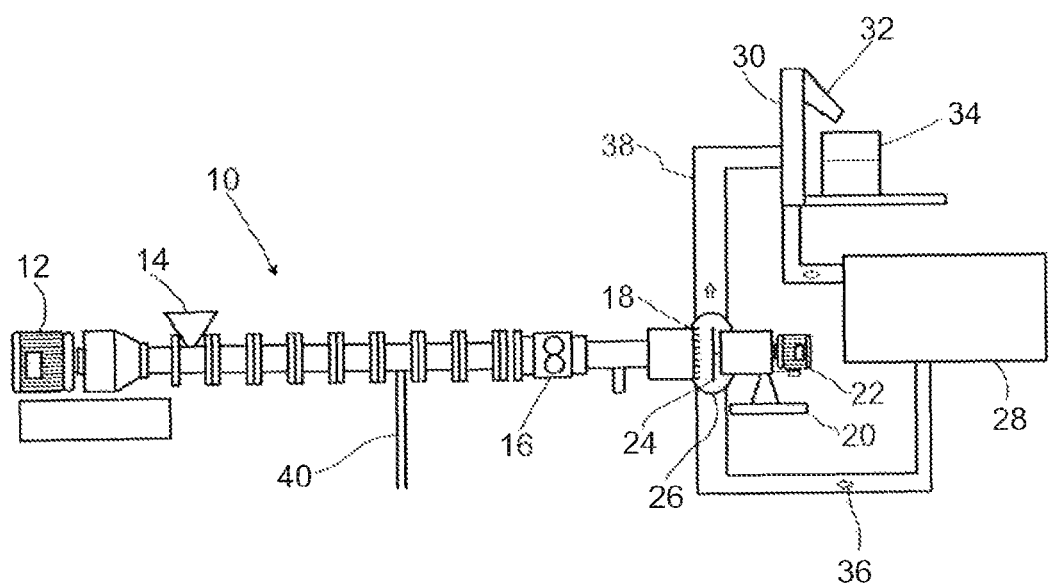

METHOD FOR PRODUCING EXPANDED GRANULES

CROSS-REFERENCE TO RELATED APPLICATIONS

This application is a national stage application (under 35 U.S.C. § 371) of PCT/EP2013/057655, filed Apr. 12, 2013, and claims the benefit of European Application No. 12164076.7, filed Apr. 13, 2012, both of which are incorporated herein by reference in their entirety.

This invention relates to a process for production of expanded pellets from a polymer melt comprising a blowing agent. Expanded pellets of thermoplastic polymers, especially of thermoplastic polyurethane (TPU), have elastic and tribological properties and so are useful in a wide variety of applications. Examples of uses for expanded pellets of thermoplastic polyurethane include reusable gymnastics mats, body protectors, trim elements in automobile building, sound and vibration absorbers, packaging or in shoe soles. High elasticity and good homogeneity on the part of the pellets are of decisive importance for all these sectors.

Foamed materials, including bead foams in particular, are long known and have been extensively described in the literature, for example in Ullmann's "Enzyklopädie der technischem Chemie", $4^{th}$ edition, volume 20, p. 416 ff.

WO 2007/082838 discloses a process for production of expanded thermoplastic polyurethane comprising a blowing agent. A first step of the process comprises extruding a thermoplastic polyurethane into pellets. The pellets are impregnated with a blowing agent in an aqueous suspension under pressure in a second step and expanded in a third step. In a further embodiment of the process, the thermoplastic polyurethane is melted in an extruder together with a blowing agent and the melt is pelletized without a device to prevent foaming. Volatile organic compounds are used as blowing agents in the production via extrusion.

The use of an extrusion process to produce expanded pellets of TPU permits continuous production and hence rapid processing of a variety of hardnesses and also the rapid switch between further properties, for example the color of the expanded beads produced.

Yet there is a problem with the direct production of expanded pellets via extrusion in that the beads expand without an uninterrupted skin forming in the process and the expanded beads collapse, making it impossible to produce beads of low bulk density. It is similarly disadvantageous that the blowing agents used are flammable and so are difficult to process because of an ever present risk of explosion. Furthermore, the expanded pellets produced have to be stored until the flammable blowing agent used has volatilized before they can be shipped out.

It is an object of the present invention to provide a process for production of expanded pellets from a polymer melt comprising a blowing agent which do have an uninterrupted skin, without the disadvantages known from the prior art.

We have found that this object is achieved by a process for production of expanded pellets from a polymer melt comprising a blowing agent, said process comprising the steps of:
a) pressing the polymer melt comprising a blowing agent through a perforated disk controlled to a temperature between 150° C. and 280° C. and into a pelletizing chamber,
b) using a cutting device to comminute the polymer melt pressed through the temperature-controlled perforated disk into individual expanding pellets,
c) discharging the pellets from the pelletizing chamber using a liquid stream,
wherein the blowing agent comprises $CO_2$ or $N_2$ or a combination of $CO_2$ and $N_2$ and the pelletizing chamber is traversed by a stream of liquid which is controlled to a temperature between 10° C. and 60° C. and the pressure of which is from 0.7 bar to 20 bar above ambient pressure, the pressure and temperature for the liquid in the pelletizing chamber and also the temperature for the perforated disk being chosen such that the pellets are expanded in the pressurized liquid by the blowing agent they contain so as to produce expanded pellets having an uninterrupted skin.

A polymer is melted, mixed with a blowing agent and also optionally further admixture agents and then forced through the perforated disk in step a) of the process. This is generally accomplished using an extruder and/or a melt pump. When an extruder, for example a twin-screw extruder, is used, the polymer is first plasticated and optionally mixed with auxiliary agents. During mixing, the material in the extruder is transported in the direction of the temperature-controlled perforated disk. If the blowing agent was not introduced into the extruder from the start together with the polymer, it can be added to the polymer after the polymer has traveled part of the distance in the extruder. The blowing agent and the polymer become mixed as they travel through the remaining distance in the extruder. In the process, the melt is brought to the temperature required for the subsequent pelletization. The pressure required for pressing the melt through the perforated disk can be applied by a melt pump for example. The pressure required for the pelletization and the temperature required for the melt are dependent on the polymer used and also the auxiliary agents used and the blowing agent used and are further dependent on the mixing ratio between the components. It is through the temperature-controlled perforated disk that the polymer melt passes into the pelletizing chamber. The pelletizing chamber is traversed by a stream of a temperature-controlled liquid, the pressure of which is from 0.7 bar to 20 bar above ambient pressure.

In the pelletizing chamber, the polymer forced through the temperature-controlled perforated disk is shaped into strands which a cutting device comminutes into individual expanding pellets. The cutting device may be embodied as a fast-rotating blade for example. The shape of the resulting pellets is dependent on the shape and size of the openings in the perforated disk and also on the pressure at which the melt is forced through the holes in the perforated disk and on the speed of the cutting device. It is preferable for the forcing pressure, the speed of the cutting device and the size of the holes in the perforated disk to be chosen such that the shape of the pellets is substantially spherical.

In the last step of the process, the pellets are discharged from the pelletizing chamber by the temperature-controlled liquid which flows through the pelletizing chamber. The choice of the pressure and the temperature for the temperature-controlled liquid is such that the polymer strands/pellets are expanded by the blowing agent they contain in controlled fashion and an uninterrupted skin is produced on the surface of the pellets.

The pellets flow together with the temperature-controlled liquid into a dryer where the pellets are separated from the liquid. The final expanded pellets are collected in a container, while the liquid is filtered and returned back into the pelletizing chamber via a pump.

Pelletization in a pressurized liquid where the temperature of the liquid is under control prevents the polymer melt comprising a blowing agent from undergoing an uncontrolled expansion in which no formation of an uninterrupted skin can take place. Such beads would initially have a low bulk density, but would quickly each collapse again. The result would be inhomogeneous beads of high bulk density and low elasticity. The process of the present invention slows the expansion of the pellets in a controlled way to produce structured particles that have an uninterrupted skin and a cellular structure on the inside, wherein the cell size is low at the surface and increases toward the center. The size of the cells at the center is less than 250 µm, preferably less than 100 µm. The bulk density of the expanded pellets is typically in the range from 30 g/l to 250 g/l and preferably in the range from 80 g/l to 120 g/l.

Pellet expansion is policed by controlling the pressure and temperature of the temperature-controlled liquid in the pelletizing chamber and also by controlling the temperature of the perforated disk. When the pellets expand too rapidly and/or in an uncontrolled fashion, meaning that no uninterrupted skin is formed, the pressure of the liquid in the pelletizing chamber is raised and the temperature of the temperature-controlled liquid in the pelletizing chamber is lowered. The increased pressure of the temperature-controlled liquid surrounding the pellets counteracts the expanding effect of the blowing agent and brakes the expansion of the pellets. Reducing the temperature of the temperature-controlled liquid in the pelletizing chamber brings about a thicker skin on the beads and thus offers more resistance to expansion. When the temperature-controlled liquid is at too high a pressure or too low a temperature relative to the blowing agent used, expansion of the pellets can be excessively hindered or even completely stopped, producing pellets where the bulk density is too high. In this case, the pressure of the temperature-controlled liquid in the pelletizing chamber is lowered and/or the temperature of the temperature-controlled liquid is raised.

Expanded pellets are preferably produced from the polymer melts comprising blowing agent when the pressure in the temperature-controlled liquid flowing through the pelletizing chamber is between 0.7 bar and 20 bar. The pressure in the liquid is more preferably between 5 and 15 bar and even more preferably between 10 and 15 bar.

As an addition or alternative to adjusting the pressure and/or the temperature of the temperature-controlled liquid in the pelletizing chamber, the expansion of the pellets can also be influenced through the temperature of the temperature-controlled perforated disk. Lowering the temperature of the temperature-controlled perforated disk has the effect of releasing heat from the polymer melt more quickly into the environment. This promotes the formation of an uninterrupted skin, which is a prerequisite for a stable foamed pellet. If the temperature of the temperature-controlled perforated disk and/or of the liquid in the pelletizing chamber is made too low, the polymer melt will cool down too quickly and solidify before adequate expansion can commence. Expansion of the pellet by the blowing agent it contains is so severely impeded as to form pellets having an excessively high bulk density. Therefore, the temperature of the temperature-controlled liquid in the pelletizing chamber and/or the temperature of the temperature-controlled perforated disk are raised in such a case.

The temperature of the liquid in the pelletizing chamber is preferably between 10° C. and 60° C. in order that the pellets may undergo a controlled expansion in which an uninterrupted foamed skin is formed. The temperature of the liquid is preferably between 25° C. and 45° C. The temperature of the temperature-controlled perforated disk is preferably between 150° C. and 280° C., more preferably between 220° C. and 260° C. and even more preferably in the range from 245° C. to 255° C.

An excessive temperature on the part of the perforated disk leads to a thin skin on the surface of the beads and to a later collapsing of the surface. Excessively low temperatures on the part of the perforated disk reduce the degree of expansion and lead to thick, unfoamed surfaces on the beads.

The process of the present invention provides expanded pellets of thermoplastic elastomers, thermoplastic elastomers of block copolymer structure, polyetheramide, polyetherester, polyesterester or a polyurethane. It is preferable to produce expanded pellets of thermoplastic polyurethane.

When a thermoplastic polyurethane is used, the thermoplastic polyurethane may be any desired thermoplastic polyurethane known to a person skilled in the art. Thermoplastic polyurethanes and their methods of making have been extensively described, for example in Gerhard W. Becker and Dietrich Braun, Kunststoffhandbuch, volume 7, "Polyurethane", Carl Hanser Verlag, Munich, Vienna, 1993.

In a preferred embodiment, the thermoplastic polyurethane is prepared by reacting a mixture of isocyanates with isocyanate-reactive compounds, preferably having a molecular weight of 0.5 kg/mol to 10 kg/mol and optionally chain-extending agents, preferably having a molecular weight of 0.05 kg/mol to 0.5 kg/mol. In a further preferred embodiment, the thermoplastic polyurethane is prepared by further adding to the mixture at least one chain transfer agent, a catalyst and optionally at least one filler, auxiliary and/or admixture agent.

The preparation of thermoplastic polyurethane requires at any rate a mixture of isocyanates and isocyanate-reactive compounds. The further addition of chain-extending agents, chain transfer agents, catalysts and filler, auxiliary and/or admixture agents is optional and can take place individually or in all possible variations.

Preferred embodiments utilize aliphatic, cycloaliphatic, araliphatic and/or aromatic isocyanates as organic isocyanates. Particular preference is given to using aromatic, aliphatic and/or cycloaliphatic diisocyanates. Examples of preferred diisocyanates are trimethylene diisocyanate, tetramethylene diisocyanate, pentamethylene diisocyanate, hexamethylene diisocyanate, heptamethylene diisocyanate, octamethylene diisocyanate, 2-methyl-1,5-pentamethylene diisocyanate, 2-ethyl-1,4-butylene diisocyanate, 1,5-pentamethylene diisocyanate, 1,4-butylene diisocyanate, 1-isocyanato-3,3,5-trimethyl-5-isocyanatomethylcyclo-hexane, 1,4-bis(isocyanatomethyl)cyclohexane, 1,3-bis(isocyanatomethyl)cyclo-hexane, 1,4-cyclohexane diisocyanate, 1-methyl-2,4-cyclohexane diisocyanate, 1-methyl-2,6-cyclohexane diisocyanate, 2,2'-dicyclohexylmethane diisocyanate, 2,4'-dicyclohexylmethane diisocyanate, 4,4'-dicyclohexylmethane diisocyanate, 2,2'-diphenylmethane diisocyanate, 2,4'-diphenylmethane diisocyanate, 4,4'-diphenylmethane diisocyanate, 1,5-naphthylene diisocyanate, 2,4-tolylene diisocyanate, 2,6-tolylene diisocyanate, diphenylmethane diisocyanate, 3,3'-dimethylbiphenyl diisocyanate, 1,2-diphenylethane diisocyanate and phenylene diisocyanate.

In addition to the isocyanate, the thermoplastic molding composition is constructed of a compound having at least two isocyanate-reactive hydrogen-containing groups. The isocyanate-reactive hydrogen-containing group is preferably a hydroxyl group. It is particularly preferable for the compound having at least two isocyanate-reactive hydrogen-containing groups to be selected from polyetherol, polyesterol and polycarbonate diol. In this context, polyesterols, polyetherols and/or polycarbonate diols are usually also subsumed under the term "polyols".

The thermoplastic polyurethane is preferably prepared from polyether alcohol. It is particularly preferable to use polyether diol here. Polytetrahydrofuran is a particularly preferred polyether diol. Preference is given to using polyether alcohols and polytetrahydrofuran having a molecular weight between 0.6 kg/mol and 2.5 kg/mol. The polyether alcohols are used individually or else as a mixture of various polyether alcohols.

In an alternative embodiment, a polyester alcohol is used to prepare the thermoplastic polyurethane. Polyester diol is used for this in a preferred embodiment. A preferred polyester diol is prepared from adipic acid and 1,4-butanediol. Preferred embodiments of polyester alcohols have a molecular weight between 0.6 kg/mol and 2.5 kg/mol.

In further preferred embodiments, the polyols used for preparing the thermoplastic polyurethane have molecular weights of 0.5 kg/mol to 8 kg/mol, more preferably of 0.6 kg/mol to 6 kg/mol and especially of 0.8 kg/mol to 4 kg/mol. In further preferred embodiments, the polyols have an average functionality of 1.8 to 2.3, more preferably of 1.9 to 2.2 and especially of 2. In a particularly preferred embodiment, the polyol is a polyester alcohol, preferably synthesized from polytetrahydrofuran and has a molecular weight between 0.6 kg/mol and 2.5 kg/mol in a further preferred embodiment.

When the thermoplastic polyurethane is prepared using chain extenders, these are preferably aliphatic, araliphatic, aromatic and/or cycloaliphatic compounds which, in further preferred embodiments, have a molecular weight of 0.05 kg/mol to 0.5 kg/mol. Chain extenders are for example compounds having two functional groups, for example diamines and/or alkanediols having 2 to 10 carbon atoms in the alkylene moiety, especially 1,4-butanediol, 1,6-hexanediol and/or di-, tri-, tetra-, penta-, hexa-, hepta-, octa-, nona- and/or decaalkylene glycols having 3 to 8 carbon atoms and corresponding oligo- and/or polypropylene glycols. Further embodiments for preparing the thermoplastic polyurethane utilize mixtures of chain extenders.

When chain transfer agents are used, these typically have a molecular weight of 0.03 kg/mol to 0.5 kg/mol. Chain transfer agents are compounds that have only one functional group in respect of isocyanates. Examples of chain transfer agents are monofunctional alcohols, monofunctional amines, preferably methylamine and/or monofunctional polyols. Chain transfer agents can be used to specifically control the flow characteristics of mixtures of the individual components. Chain transfer agents in preferred embodiments are used in an amount of 0 part by weight to 5 parts by weight and more preferably in the range from 0.1 part by weight to 1 part by weight, based on 100 parts by weight of the compound having at least two isocyanate-reactive hydrogen-containing groups. Chain transfer agents are used in addition to or instead of chain extenders.

Further embodiments utilize at least one catalyst to prepare thermoplastic polyurethane to catalyze in particular the reaction between the isocyanate groups of the diisocyanates and the isocyanate-reactive compounds, preferably hydroxyl groups, of the compound having at least two isocyanate-reactive hydrogen-containing groups, the chain transfer agents and the chain extenders. In preferred embodiments, the catalyst is selected from the group of tertiary amines, for example triethylamine, dimethylcyclohexylamine, N-methylmorpholine, N,N'-dimethylpiperazine, 2-(dimethylaminoethoxy)ethanol, diaza-bicyclo(2,2,2)octane and similar substances. In further preferred embodiments, the at least one catalyst is selected from the group of organometallic compounds and is, mentioned by way of example, a titanic ester, an iron compound, for example iron(III) acetylacetonate, a tin compound, for example tin diacetate, tin dioctoate, tin dilaurate or a tin dialkyl salt of an aliphatic carboxylic acid such as dibutyltin diacetate, dibutyltin dilaurate or the like.

Some embodiments utilize the catalysts individually, while other embodiments utilize mixtures of catalysts. The catalyst used in one preferred embodiment is a mixture of catalysts in amounts of 0.0001 wt % to 0.1 wt %, based on the compound having at least two isocyanate-reactive hydrogen-containing groups, preferably the polyhydroxy compound.

Useful auxiliary and/or admixture agents include for example hydrolysis control agents and foam retardants. Further admixture agents and auxiliary agents are discernible from standard reference works such as for example the above-cited Gerhard W. Becker and Dietrich Braun, Kunststoffhandbuch, volume 7 "Polyurethane", Carl Hanser Verlag, Munich, Vienna, 1993.

In addition to catalysts, but also without the use of catalysts, hydrolysis control agents, for example polymers and low molecular weight carbodiimides, can also be added to the isocyanates and the compound having at least two isocyanate-reactive hydrogen-containing groups to prepare the thermoplastic polyurethane.

In a further embodiment, the thermoplastic polyurethane may comprise a phosphorus compound. A preferred embodiment uses organophosphorus compounds of trivalent phosphorus, for example phosphites and phosphonites. Examples of suitable phosphorus compounds are triphenyl phosphites, diphenyl alkyl phosphite, phenyl dialkyl phosphite, tris(nonylphenyl)phosphite, trilauryl phosphite, trioctadecyl phosphite, distearylpentaerythritol disphosphite, tris(2,4-di-tert-butylphenyl) phosphite, diisodecylpentaerythritol diphosphite, di(2,4-di-tert-butylphenyl)pentaerythritol diphosphite, tristearylsorbitol triphosphite, tetrakis(2,4-di-tert-butylphenyl)-4,4'-biphenylylene diphosphonite, triisodecyl phosphite, diisodecyl phenyl phosphite and diphenyl isodecyl phosphite or mixtures thereof.

Particularly preferred embodiments comprise phosphorus compounds that are difficult to hydrolyze, since the hydrolysis of a phosphorus compound to the corresponding acid can lead to damage being inflicted on the polyurethane, especially the polyester urethane. Accordingly, phosphorus compounds that are particularly difficult to hydrolyze are suitable for polyester polyurethanes in particular. Preferred embodiments of difficult-to-hydrolyze phosphorus compounds are dipolypropytene glycol phenyl phosphite, diisodecyl phosphite, triphenylmono-decyl phosphite, triisononyl phosphite, tris(2,4-di-tert-butylphenyl) phosphite, tetrakis(2,4-di-tert-butylphenyl)-4,4'-biphenylylene diphosphonite and di(2,4-di-tert-butylphenyl)pentaerythritol diphosphite or mixtures thereof.

To set the Shore hardness of thermoplastic polyurethanes the compounds having at least two isocyanate-reactive hydrogen-containing groups and the chain extenders can be varied within relatively wide molar ratios. In preferred embodiments the molar ratio of compounds having at least two isocyanate-reactive hydrogen-containing groups to total chain extender used is in the range from 10:1 to 1:10, preferably in the range from 5:1 to 1:8 and more preferably in the range from 1:1 to 1:4, the hardness of the thermoplastic polyurethane increasing with increasing chain-extender content. Shore hardnesses ranging from A44 to D80 can be set in this way. Shore hardnesses ranging from A44 to A120 are particularly preferred. Shore hardnesses are determined according to DIN 53505.

In further preferred embodiments, the reaction to form the thermoplastic polyurethane is carried out at customary indices. The index is defined as the ratio of the total number of isocyanate groups of the aromatic, aliphatic and/or cycloaliphatic diisocyanate which are used in the reaction to the total number of isocyanate-reactive groups, i.e., the number of active hydrogens in the compound having at least two isocyanate-reactive hydrogen-containing groups and the chain extenders. An index of 100 means that there is one active hydrogen atom, i.e., an isocyanate-reactive function of the compound having at least two isocyanate-reactive hydrogen-containing groups and the chain extenders per isocyanate group of the aromatic, aliphatic and/or cycloaliphatic diisocyanate. Indices above 100 mean that there are more isocyanate groups than there are isocyanate-reactive groups, for example hydroxyl groups.

In particularly preferred embodiments the reaction to form the thermoplastic polyurethane takes place at an index between 60 and 120 and more preferably at an index between 80 and 110.

In addition, the thermoplastic molding composition may optionally comprise at least one additive. The term additive subsumes fillers, auxiliaries and admixtures and also the above-described chain transfer agents, chain extenders and catalysts. The additives can be used in any desired mixtures. The fraction of the overall mass of the thermoplastic molding composition which is attributable to additives is preferably in the range from 0 to 80 wt %.

Auxiliaries and admixtures typically used include for example surface-active substances, flame retardants, oxidation stabilizers, slip and demolding assistants, dyes and pigments, optionally additional further stabilizers, for example against hydrolysis, light, heat or discoloration, reinforcing agents and plasticizers. Any fillers can be organic and/or inorganic.

When fillers are comprised, these are for example organic and inorganic powders or fibrous materials and also mixtures thereof. Useful organic fillers include for example wood flour, starch, flax fibers, hemp fibers, ramie fibers, jute fibers, sisal fibers, cotton fibers, cellulose fibers or aramid fibers. Useful inorganic fillers include for example silicates, barite, glass balls, zeolites, metals or metal oxides. Particular preference is given to using pulverulent inorganics such as chalk, kaolin, aluminum hydroxide, magnesium hydroxide, aluminum nitrite, aluminum silicate, barium sulfate, calcium carbonate, calcium sulfate, silica, powdered quartz. Aerosil, argillaceous earth, mica or wollastonite or spherical or fibrous inorganics, for example iron powder, glass balls, glass fibers or carbon fibers. The average particle diameter or, in the case of fibrous fillers, the length of the fibers should be in the region of the cell size or less. Preference is given to an average particle diameter or average fiber length in the range from 0.1 to 100 µm and preferably in the range from 1 to 50 µm. Preference is given to expandable thermoplastic polyurethanes which comprise a blowing agent and also between 5 to 80 wt % of organic and/or inorganic fillers, based on the total weight of the thermoplastic polyurethane comprising a blowing agent.

Useful surface-active substances for inclusion in the thermoplastic molding composition include for example compounds which are used to augment homogenization of starting materials and may also be capable of regulating the cell structure. Suitable surface-active substances include for example emulsifiers, for example sodium salts of castor oil sulfates or of fatty acids and also salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers such as siloxane-oxyalkylene interpolymers and other organosiloxanes, ethoxylated alkylphenols, ethoxylated fatty alcohols, paraffin oils, castor oil esters or ricinoleic esters, Turkey red oil and peanut oil, and cell regulators, for example paraffins, fatty alcohols and dimethylpolysiloxane. Oligomeric polyacrylates having polyoxyalkytene and fluoroalkane moieties as side groups are further useful for improving the emulsifying effect, the cell structure and/or the stabilization thereof. Surface-active substances are typically used in amounts of 0.01 to 5 wt %, based on 100 wt % of compound having at least two isocyanate-reactive hydrogen-containing groups.

Suitable flame retardants include for example tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate. In addition to the halogen-substituted phosphates already mentioned, inorganic flame retardants comprising red phosphorus, aluminum oxide hydrate, antimony trioxide, arsenic trioxide, ammonium polyphosphate and calcium sulfate or cyanuric acid derivatives, for example melamine or mixtures of at least two flame retardants, for example ammonium phosphate and melamine and also optionally starch and/or expandable graphite can also be used for conferring flame retardancy on the foamed polyurethanes produced. It will generally prove advantageous to use from 0 to 50 wt % and preferably from 5 to 25 wt % of flame retardant or flame retardant mixtures for each 100 parts by weight of the diisocyanate, of the compounds with at least two isocyanate-reactive hydrogen-containing groups and of the chain extenders.

Before the polymer melt is pressed into the pelletizing chamber, it is mixed with the blowing agent $CO_2$ and/or $N_2$ and more preferably a combination of $CO_2$ and $N_2$. A co-blowing agent can additionally be added to the polymer melt. Useful co-blowing agents include alkanes such as ethane, propane, butane, pentane, alcohols such as ethanol, isopropanol, halogenated hydrocarbons or CFCs or a mixture thereof. The sole use of $CO_2$ and/or $N_2$ and also their combination as blowing agent is particularly advantageous, since they are inert gases, which are nonflammable, so that no potentially explosive atmospheres can arise in manufacture. This makes cost-intensive safety precautions unnecessary and greatly reduces potential risk in production. It is likewise advantageous that the products do not have to be stored to allow flammable volatiles to gas out before the products are shipped out.

Further advantages arise on additionally adding one or more nucleating agents to the polymer melt comprising a blowing agent. Useful nucleating agents include in particular talc, calcium fluoride, sodium phenylphosphinate, aluminum oxide, carbon black, graphite, pigments and finely divided polytetrafluoroethylene each individually or else in any mixtures. Talc is particularly preferable for use as nucleating agent. The proportion of the overall mass of the thermoplastic molding composition or of the polymer melt which is attributable to the nucleating agent is preferably in the range from 0 to 4 wt % and especially in the range from 0.1 to 2 wt %.

The invention will now be more particularly described with reference to drawings. The sole FIGURE shows a schematic depiction of an apparatus for pelletizing polymer melts.

FIG. 1 shows a schematic depiction of an apparatus for producing expanded pellets from a polymer melt comprising a blowing agent. The starting polymer is introduced into an extruder 10 via a feed hopper 14. The extruder 10 is configured for example as a twin-screw extruder and is powered via a motor 12. The feed hopper 14 may further be used to add auxiliaries such as for example dyes or nucleating agents. Thermoplastic polyurethane is a suitable polymer and talc is an example of a suitable nucleating agent. The raw material introduced is melted and plasticated in the extruder. In the process, the material is transported in the direction of a perforated disk 18.

In the embodiment depicted in FIG. 1 a melt pump 16 is disposed upstream of the perforated disk 18 to apply a pressure to the melt. The pressure is chosen as a function of the type and quantity of blowing agent used. The blowing agent is introduced into the polymer melt via an add point 40 on the extruder 10 between the feed hopper 14 and the melt pump 16. In the depicted embodiment the add point 40 for the blowing agent is disposed such that the blowing agent is only added after all the polymer has melted. The introduced blowing agent becomes incorporated into the melt during the remaining distance in the extruder. A mixture of carbon dioxide and nitrogen is an example of the suitable blowing agent.

The melt pump 16 forces the melt through the perforated disk 18 and into a pelletizing chamber 26. The pelletizing chamber is traversed by a stream of liquid, the pressure of which is above ambient pressure. The direction of flow is indicated by the arrows 36. Inside the pelletizing chamber 26 a rotating blade 24 is disposed in a pelletizing means 20. The rotating blade 24 is driven by a motor 22. The polymer melt exits from the perforated disk 18 as a plurality of expanding polymeric strands which are chopped off by the rotating blade 24. Individual expanding pellets are produced in the process. The forcing pressure and also the speed of the cutting device are chosen such that the shape of the pellets is substantially spherical.

The pellets in the temperature-controlled liquid are expanded by the blowing agent they contain, while the temperature of the temperature-controlled liquid and of the temperature-controlled perforated disk and also the pressure of the temperature-controlled liquid have been chosen such that the expanded pellets have an uninterrupted foamed skin. The stream of temperature-controlled liquid discharges the resulting expanding/expanded pellets from the pelletizing chamber 26 and feeds them via the circuit line 38 into a dryer 30. In the dryer 30, the expanded pellets are separated from the temperature-controlled liquid and dried and sent, via the product discharge 32, into a collecting container 34. The temperature-controlled liquid from which the pellets have been removed continues to flow through the circuit line 38 into a circuit pump 28, where the temperature-controlled liquid is filtered, temperature controlled and pressurized. From the circuit pump 28 the temperature-controlled liquid flows back into the pelletizing chamber 26.

The examples which follow provide further elucidation of the invention;

EXAMPLE 1

A twin-screw extruder having a screw diameter of 18 mm and a length to diameter ratio of 40 is charged with 99.5 parts by weight of a thermoplastic polyurethane (TPU) produced from 61.1 wt % of polytetrahydrofuran having an average molecular weight (MW) of 1000 g/mol, 31.7 wt % of 4,4-diphenylmethane diisocyanate, 5.7 wt % of 1,4-butanediol, 1.0 wt % of a phenolic antioxidant and 0.5 wt % of UV-stabilizers, the PTU obtainable for example under the trade name of Elastollan 1180 A 10U® from BASF SE, and 0.5 part by weight of talc. The thermoplastic polyurethane was melted in the melting zone of the twin-screw extruder and mixed with the talc. After the melting of the thermoplastic polyurethane and the admixing of the talc, the blowing agents $CO_2$ and $N_2$ were added in the amounts listed in table 1. In the course of traveling the remaining distance in the extruder, the blowing agent and the polymer melt became mixed with each other to form a homogeneous mixture. Total throughput through the extruder which contained the TPU, the talc and the two blowing agents was 3.5 kg/h. The temperature in the extruder in the melting zone and during the admixing of the talc into the TPU was 220° C. The temperature at the extruder housing of the injection site was reduced to 200° C. and the subsequent housing to 190° C. All further housing parts up to the extruder end and also the melt pump were maintained at 180° C. The melt pump produced a 90 bar pressure at the end of the extruder. The temperature of the startup valve was set to 210° C. and the perforated disk was heated to a target temperature of 260° C. by electric heating. The mixture of TPU, talc and blowing agent which emerges from the perforated disk was pressed through the perforated disk having a hole 1 mm in size and chopped off in the downstream water-traversed pelletizing chamber by 10 rotating blades attached to a ring of blades. During its presence in the pelletizing chamber the mixture expands. Beads having an average size of about 2 mm and a weight of about 2 mg were produced in the process. The further varied parameters and also the bulk densities achieved are listed below in table 1.

To determine bulk density, a 100 ml vessel was filled with the expanded particles and weighed to an accuracy of ±5 g/l

TABLE 1

| $CO_2$ (parts by wt.) | $N_2$ (parts by wt.) | P (water) (bar) | T (water) (° C.) | Bulk density (g/l) |
|---|---|---|---|---|
| 4 | 0 | 1 | 40 | 370 |
| 4 | 0 | 6 | 40 | 445 |
| 4 | 0 | 10 | 42 | 395 |
| 4 | 0 | 15 | 46 | 225 |
| 2 | 0 | 15 | 49 | 110 |
| 2 | 0 | 10 | 47 | 130 |
| 2 | 0 | 6 | 42 | 170 |
| 2 | 0 | 1 | 41 | 340 |
| 1.5 | 0 | 1 | 40 | 330 |
| 1.5 | 0 | 6 | 39 | 140 |
| 1.5 | 0 | 10 | 41 | 150 |
| 1.5 | 0 | 15 | 46 | 150 |
| 1.5 | 0 | 10 | 50 | 135 |
| 1.5 | 0 | 6 | 50 | 160 |
| 1.5 | 0 | 1 | 50 | 340 |
| 3 | 0 | 10 | 32 | 150 |
| 3 | 0 | 15 | 34 | 130 |
| 2.5 | 0 | 10 | 33 | 120 |
| 2.5 | 0 | 15 | 32 | 130 |
| 2 | 0 | 15 | 32 | 150 |
| 2 | 0 | 10 | 32 | 130 |
| 1.5 | 0 | 10 | 32 | 200 |
| 1.5 | 0 | 15 | 32 | 220 |
| 2 | 0 | 15 | 40 | 115 |
| 2.5 | 0.15 | 15 | 40 | 100 |
| 2.5 | 0.15 | 10 | 40 | 285 |
| 2.5 | 0.15 | 10 | 30 | 250 |
| 2.5 | 0.15 | 15 | 30 | 110 |

TABLE 1-continued

| $CO_2$ (parts by wt.) | $N_2$ (parts by wt.) | P (water) (bar) | T (water) (° C.) | Bulk density (g/l) |
|---|---|---|---|---|
| 2 | 0.15 | 10 | 30 | 115 |
| 2 | 0.15 | 15 | 30 | 125 |
| 1.5 | 0.15 | 10 | 30 | 150 |
| 1.5 | 0.15 | 15 | 30 | 150 |
| 1.5 | 0.3 | 15 | 30 | 130 |
| 2 | 0.3 | 15 | 30 | 120 |
| 2.5 | 0.3 | 15 | 30 | 95 |
| 2.5 | 0.3 | 10 | 30 | 285 |
| 2.5 | 0.3 | 12 | 30 | 150 |
| 2.5 | 0.15 | 15 | 30 | 180 |
| 2 | 0.15 | 15 | 30 | 160 |
| 1.5 | 0.15 | 15 | 30 | 140 |

EXAMPLE 2

The processing sequence corresponds to that described in Example 1, except that the temperature in the extruder in the melting zone during the mixing of the talc into the TPU was set to 230° C. and the temperature of all subsequent extruder housing parts and of the melt pump was set to 200° C. The temperature of the startup valve continued to be 210° C. and the temperature of the temperature-controlled perforated disk was set to 250° C., different than Example 1. The tests were carried out not only with $CO_2$ as blowing agent without addition of nitrogen but also with a mixture additionally comprising 0.3 part by weight of $N_2$ as blowing agent. The result was again beads having a size of about 2 mm and a weight of about 2 mg being obtained. The dosed parts by weight of blowing agent and also the pressure and temperature of the temperature-controlled liquid in the pelletizing chamber and the bulk densities obtained are summarized in table 2.

TABLE 2

| $CO_2$ (parts by wt.) | $N_2$ (parts by wt.) | P (water) (bar) | T (water) (° C.) | Bulk density (g/l) |
|---|---|---|---|---|
| 1.25 | 0 | 1 | 30 | 160 |
| 1.25 | 0 | 5 | 30 | 160 |
| 1.25 | 0 | 10 | 30 | 200 |
| 1.25 | 0 | 15 | 30 | 230 |
| 1.25 | 0.3 | 1 | 30 | 360 |
| 1.25 | 0.3 | 5 | 30 | 165 |
| 1.25 | 0.3 | 10 | 30 | 105 |
| 1.25 | 0.3 | 15 | 30 | 100 |
| 1.0 | 0 | 1 | 30 | 160 |
| 1.0 | 0 | 5 | 30 | 325 |
| 1.0 | 0 | 10 | 30 | 440 |
| 1.0 | 0 | 15 | 30 | 495 |
| 1.0 | 0.3 | 1 | 30 | 350 |
| 1.0 | 0.3 | 5 | 30 | 130 |
| 1.0 | 0.3 | 10 | 30 | 100 |
| 1.0 | 0.3 | 15 | 30 | 95 |
| 0.75 | 0 | 1 | 30 | 180 |
| 0.75 | 0 | 5 | 30 | 440 |
| 0.75 | 0 | 10 | 30 | 550 |
| 0.75 | 0 | 15 | 30 | 520 |
| 0.75 | 0.3 | 1 | 30 | 345 |
| 0.75 | 0.3 | 5 | 30 | 345 |
| 0.75 | 0.3 | 10 | 30 | 120 |
| 0.75 | 0.3 | 15 | 30 | 105 |
| 0.5 | 0 | 1 | 30 | 265 |
| 0.5 | 0 | 5 | 30 | 525 |
| 0.5 | 0 | 10 | 30 | 525 |
| 0.5 | 0 | 15 | 30 | 530 |
| 0.5 | 0.3 | 1 | 30 | 345 |
| 0.5 | 0.3 | 5 | 30 | 115 |
| 0.5 | 0.3 | 10 | 30 | 105 |
| 0.5 | 0.3 | 15 | 30 | 100 |

EXAMPLE 3

The process sequence corresponds to that described for Example 2, except that isopentane was used as blowing agent. One part designed as comparative tests used exclusively isopentane as blowing agent. These tests were subsequently repeated with a blowing agent mixture further comprising 0.3 part by weight of $N_2$. The result was again beads having a size of about 2 mm and a weight of about 2 mg being obtained. The dosed parts by weight of blowing agent and also the pressure and temperature of the temperature-controlled liquid in the pelletizing chamber and the bulk densities obtained are summarized in table 3. It transpires that isopentane without nitrogen does not provide densities of less than 200 g/l.

TABLE 3

| Isopentane (parts by wt.) | $N_2$ (parts by wt.) | P (water) (bar) | T (water) (° C.) | Bulk density (g/l) |
|---|---|---|---|---|
| 4.0 | 0 | 1 | 30 | 385 |
| 4.0 | 0 | 5 | 30 | 400 |
| 4.0 | 0 | 10 | 30 | 445 |
| 4.0 | 0 | 15 | 30 | 420 |
| 4.0 | 0.3 | 1 | 30 | 375 |
| 4.0 | 0.3 | 5 | 30 | 150 |
| 4.0 | 0.3 | 10 | 30 | 100 |
| 4.0 | 0.3 | 15 | 30 | 95 |
| 3.0 | 0 | 1 | 30 | 280 |
| 3.0 | 0 | 5 | 30 | 450 |
| 3.0 | 0 | 10 | 30 | 440 |
| 3.0 | 0 | 15 | 30 | 420 |
| 3.0 | 0.3 | 1 | 30 | 405 |
| 3.0 | 0.3 | 5 | 30 | 135 |
| 3.0 | 0.3 | 10 | 30 | 100 |
| 3.0 | 0.3 | 15 | 30 | 95 |

EXAMPLE 4

The processing sequence corresponds to that described in Example 2, except that a composition produced from 61.2 wt % of polytetrahydrofuran having an average molecular weight (MW) of 1000 g/mol, 31.9 wt % of 4,4-diphenylmethane diisocyanate, 5.9 wt % of 1,4-butanediol and 1.0 wt % of a phenolic antioxidant, the PTU being obtainable for example under the trade name of Elastollan SP 9213 10®, and a composition produced from 47.9 wt % of ethylene glycol/butanediol-adipate, 39.7 wt % of 4,4-diphenylmethane diisocyanate, 12.1 wt % 1,4-butanediol and 0.3 wt % of a hydrolysis stabilizer, the PTU being obtainable for example under the trade name of Elastollan S98A®, are used as TPU. The TPUs are charged together with 0.5 parts by weight of talc. Varying parts by weight of $CO_2$ and 0.3 parts by weight of $N_2$ in all settings where used as blowing agents. As result beads having a particle size of about 2 mm and a weight of about 2 mg where obtained again. The used TPU, the part by weight of the charged CO2 as well as the pressure and the temperature of the temperature-controlled liquid in the pelletizing chamber and the bulk densities achieved are summarized in table 4.

TABLE 4

| TPU | $CO_2$ (parts by weight) | P (water) (bar) | T (water) (° C.) | Bulk density (g/l) |
|---|---|---|---|---|
| SP 9213 10 | 2.5 | 5 | 29 | 335 |
| SP 9213 10 | 2.5 | 15 | 32 | 100 |
| SP 9213 10 | 1.5 | 15 | 31 | 125 |

TABLE 4-continued

| TPU | $CO_2$ (parts by weight) | P (water) (bar) | T (water) (° C.) | Bulk density (g/l) |
|---|---|---|---|---|
| SP 9213 10 | 1.5 | 10 | 29 | 120 |
| SP 9213 10 | 1.5 | 5 | 28 | 255 |
| SP 9213 10 | 1.5 | 1 | 29 | 435 |
| SP 9213 10 | 1.0 | 10 | 26 | 145 |
| S98A | 2.5 | 5 | 30 | 220 |
| S98A | 2.5 | 15 | 32 | 200 |
| S98A | 1.5 | 15 | 32 | 230 |
| S98A | 1.5 | 10 | 30 | 205 |
| S98A | 1.5 | 5 | 29 | 170 |
| S98A | 1.5 | 1 | 30 | 365 |
| S98A | 1.0 | 10 | 30 | 240 |

EXAMPLE 5

A twin-screw extruder having a screw diameter of 81 mm and a length to diameter ratio of 35 is charged with 99.8 parts by weight of the thermoplastic polyurethane Elastollan 1180 A 10U® and 0.2 parts by weight of talc. The TPU was melted in the melting zone of the twin-screw extruder and mixed with the talc. After the melting of the TPU and the admixing of the talc, the blowing agent $CO_2$ was injected in the amounts listed in table 5. In the course of traveling the remaining distance in the extruder, the blowing agent, the polymer melt and the talc became mixed with each other to form a homogeneous mixture. Total throughput through the extruder which contained the TPU, the talc and the blowing agent was 140.3 kg/h. The temperature in the extruder in the melting zone during the admixing of the talc into the TPU was 205° C. The temperature at the extruder housing of the injection site was reduced to 200° C. and the temperature of subsequent housings to 175° C. The adapter which constitutes the passage between extruder and melting channel was temperature controlled to 180° C. The temperature of the startup valve, the melt pump, the adapter between melt pump and startup valve as well as the second startup valve was set to 160° C. The filter, the adapter between filter and perforated disk and the perforated disk where heated with an electric heater to a set temperature of 200° C. The melt pump produced a 90 bar pressure at the end of the extruder. The mixture of TPU, talc and blowing agent which emerges from the perforated disk was pressed through the perforated disk having 12 holes 1.8 mm in size and chopped off in the downstream water-traversed pelletizing chamber by 6 rotating blades attached to a ring of blades. During its presence in the pelletizing chamber the mixture expands. Beads having an average size of about 6 mm and a weight of about 22 mg where produced in the process. The further varied parameters and also the bulk densities achieved are listed below in table 5. To determine bulk density, a 10 l vessel was filled with the expanded particles and the weight has been measured using a scale. An accuracy of: 5 g/l can be assumed.

TABLE 5

| $CO_2$ (parts by wt.) | P (water) (bar) | T (water) (° C.) | Bulk density (g/l) |
|---|---|---|---|
| 1.1 | 2 | 35 | 155 |
| 1.3 | 2 | 35 | 140 |
| 1.3 | 2 | 20 | 140 |
| 1.4 | 2 | 20 | 150 |
| 1.8 | 6 | 20 | 180 |

TABLE 5-continued

| $CO_2$ (parts by wt.) | P (water) (bar) | T (water) (° C.) | Bulk density (g/l) |
|---|---|---|---|
| 2.1 | 6 | 20 | 155 |
| 2.5 | 6 | 20 | 130 |

EXAMPLE 6

The processing sequence corresponds to that described in Example 5, except that 99.3 parts by weight of the thermoplastic polyurethane Elastollan 1180 A 10U® and 0.7 parts by weight of talc where charged. The temperature of the adapter in front of the perforated disk was set to 190° C. and the temperature of the perforated disk was set to 180° C. All further temperatures correspond to those given in Example 5. The melt pump produced a 60 bar pressure at the end of the extruder. The mixture of TPU, talc and blowing agent which emerges from the perforated disk was pressed through the perforated disk having six holes 2.4 mm in size and chopped off in the downstream water-traversed pelletizing chamber by 6 rotating blades attached to a ring of blades. As result beads with a particle size of about 7 mm and a weight of about 33 mg where obtained. The charged parts by weight of the blowing agent, the pressure and temperature of the temperature-controlled liquid in the pelletizing chamber and the bulk densities achieved are summarized in table 6.

TABLE 6

| $CO_2$ (parts by wt.) | P (water) (bar) | T (water) (° C.) | Bulk density (g/l) |
|---|---|---|---|
| 0.9 | 2 | 25 | 150 |
| 0.9 | 10 | 25 | 175 |

EXAMPLE 7

A twin-screw extruder having a screw diameter of 44 mm and a length to diameter ratio of 30 is charged with 100 parts by weight of the thermoplastic polyurethane Elastollan 1180 A 10U®. The TPU was melted in the melting zone of the twin-screw extruder. After the TPU was melted in the melting zone of the twin-screw extruder, the blowing agent iso-butane was injected into the extruder in the amounts listed in table 7. In the course of traveling the remaining distance in the extruder, the blowing agent, the polymer melt and the talc became mixed with each other to form a homogeneous mixture. Total throughput through the extruder which contained the TPU and the blowing agent was 65 kg/h. The temperature in the extruder in the melting zone was 205° C. The temperature at the extruder housing of the injection site was reduced to 190° C. and the temperature of the subsequent housing to 170° C. All further housing parts up to the extruder end and also the melt pump were maintained at 170° C. The melt pump produced a 50 bar pressure at the end of the extruder. The temperature of the perforated disk was heated by an electric heater to a set temperature of 240° C. The mixture of TPU and blowing agent which emerges from the perforated disk was pressed through the perforated disk having 12 holes 2.4 mm in size and chopped off in the downstream water-traversed pelletizing chamber by 8 rotating blades attached to a ring of blades. During its presence in the pelletizing chamber the mixture expands. As result beads with a particle size of about 5 mm and a weight of about 15 mg where produced. The further varied parameters and also the bulk densities achieved are listed below in table 7. To determine bulk density, a 10 l vessel was filled with the expanded particles and the weight has been measured using a scale. An accuracy of ±5 g/l can be assumed.

TABLE 7

| Iso-Butane (parts by wt.) | P (water) (bar) | T (water) (° C.) | Bulk density (g/l) |
|---|---|---|---|
| 2.2 | 2 bar | 30 | 140 |
| 2.1 | 2 bar | 30 | 120 |
| 3 | 2 bar | 30 | 115 |
| 3 | 2 bar | 30 | 100 |
| 3 | 2 bar | 30 | 110 |

EXAMPLE 8

The processing sequence corresponds to that described in Example 6, except that the perforated disk has been exchanged (12 holes 2.8 mm in size) and the experiments of table 6 have been repeated. As result beads with a particle size of about 5 mm and a weight of about 15 mg where again obtained. The charged parts by weight of the blowing agent, pressure and temperature of the temperature-controlled liquid in the pelletizing chamber and the bulk densities achieved are listed in table 8.

TABLE 8

| Iso-Butane (parts by wt.) | P (water) (bar) | T (water) (° C.) | Bulk density (g/l) |
|---|---|---|---|
| 2.5 | 2 bar | 30 | 124 |
| 2.5 | 2 bar | 30 | 125 |

LIST OF REFERENCE NUMERALS

10 Extruder
12 Motor
14 Feed hopper
16 Melt pump
18 Perforated disk
20 Pelletizer
22 Pelletizer drive
24 Blade
26 Pelletizing chamber
28 Circuit pump
30 Dryer
32 Product discharge
34 Collecting container
36 Flow direction
38 Circuit line
40 Blowing agent add point

We claim:

1. A process for production of expanded pellets from a polymer melt comprising a blowing agent and a thermoplastic polyurethane, said process comprising the steps of:
   a) pressing the polymer melt through a perforated disk controlled to a temperature between 150° C. and 280° C. and into a pelletizing chamber,
   b) using a cutting device to comminute the polymer melt pressed through the perforated disk into individual expanding pellets,
   c) discharging the pellets from the pelletizing chamber using a liquid stream,
       wherein the blowing agent comprises $CO_2$ or $N_2$ or a combination of $CO_2$ and $N_2$,
       wherein the pelletizing chamber is traversed by a stream of liquid which is controlled to a temperature between 10° C. and 60° C. and the pressure of which is from 0.7 bar to 20 bar above ambient pressure,
       wherein the pressure and temperature for the liquid in the pelletizing chamber and also the temperature for the perforated disk are chosen such that the pellets are expanded in the pressurized liquid by the blowing agent they contain so as to produce expanded pellets having an uninterrupted skin, wherein the bulk density of the expanded pellets is between 30 g/l and 250 g/l,
       wherein the temperature of the liquid in the pelletizing chamber is lowered when the pellets undergo an uncontrolled expansion which does not produce an uninterrupted skin and is raised when there is no or insufficient expansion of the pellets and wherein the temperature of the perforated disk is lowered when the pellets undergo an uncontrolled expansion which does not produce an uninterrupted skin and is raised when there is no or insufficient expansion of the pellets.

2. The process according to claim 1, wherein the polymer melt comprises a nucleating agent.

3. The process according to claim 2, wherein the nucleating agent has a size between 0.01 µm and 100 µm and is selected from the group consisting of talc, calcium fluoride, sodium phenylphosphinate, aluminum oxide, carbon black, graphite, pigments, finely divided polytetrafluoroethylene and a mixture thereof.

4. The process according to claim 1, wherein the blowing agent comprises a co-blowing agent and wherein the co-blowing agent is selected from the group consisting of an alkane, an alcohol, a halogenated hydrocarbon and a mixture thereof.

5. The process according to claim 1, wherein the mass of a bead of the pellets is between 2 mg and 40 mg.

6. The process according claim 1, wherein the bead width, the bead height and the bead length of a bead of the pellets are each between 2 mm and 20 mm.

7. The process according to claim 1, wherein the beads of the pellets have a cell size below 250 µm.

* * * * *